US006490699B2

(12) United States Patent
Nishibe et al.

(10) Patent No.: US 6,490,699 B2
(45) Date of Patent: *Dec. 3, 2002

(54) COMPUTER MONITOR DEVICE

(75) Inventors: Yasushi Nishibe, Aichi-ken (JP); Yoshiharu Kawarazaki, Aichi-ken (JP)

(73) Assignee: Kabushiki Kaisha Tokai-Rika-Denki-Seisakusho, Aichi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/308,654

(22) PCT Filed: Dec. 1, 1997

(86) PCT No.: PCT/JP97/04382

§ 371 (c)(1), (2), (4) Date: Jun. 1, 1999

(87) PCT Pub. No.: WO98/25206

PCT Pub. Date: Jun. 11, 1998

(65) Prior Publication Data

US 2002/0152433 A1 Oct. 17, 2002

(30) Foreign Application Priority Data

Dec. 2, 1996 (JP) .............................. 8-322017

(51) Int. Cl.[7] ................................ G06F 11/00
(52) U.S. Cl. .......................... 714/55; 714/51
(58) Field of Search ............... 714/51, 55, 23

(56) References Cited

U.S. PATENT DOCUMENTS 4,615,005 A * 9/1986 Maejima et al. ............ 364/200
4,698,748 A * 10/1987 Juzswik et al. ............. 364/200
4,752,930 A 6/1988 Kitamura et al.
5,175,845 A 12/1992 Little
5,237,698 A * 8/1993 Ohmae ...................... 395/750
5,278,976 A * 1/1994 Wu ............................ 395/575
5,544,082 A * 8/1996 Garcia-Duarte et al. .... 364/707
5,649,098 A * 7/1997 Shieh et al. ............ 395/185.08
5,704,038 A * 12/1997 Mueller et al. ........ 395/185.08
5,761,414 A * 6/1998 Akaishi et al. ........ 395/185.08

FOREIGN PATENT DOCUMENTS

| GB | 2 316 779 a | 3/1998 |
| JP | 5-61726 | 3/1993 |
| JP | 5-189272 | 7/1993 |

* cited by examiner

Primary Examiner—Robert Beausoleil
Assistant Examiner—Michael Muskulinski
(74) Attorney, Agent, or Firm—Nixon Peabody LLP; Thomas W. Cole

(57) ABSTRACT

A microcomputer is not stopped to be monitored even in a state in which a wrong standby signal is detected. A watchdog circuit 34 outputs a starting signal to a microcomputer 30. An output signal Q of a determination circuit 36 is reset by this starting signal. If the determination circuit does not detect a standby signal st when a clock signal CK is input from the started microcomputer, the output signal Q is set. However, if the determination circuit detects the standby signal st, the output signal is held in a reset state. Even if the standby signal st is input, because an AND circuit 38 does not output a standby signal ST due to the reset of the output signal Q, the watchdog circuit is prevented from entering a standby mode by the standby signal st.

6 Claims, 6 Drawing Sheets

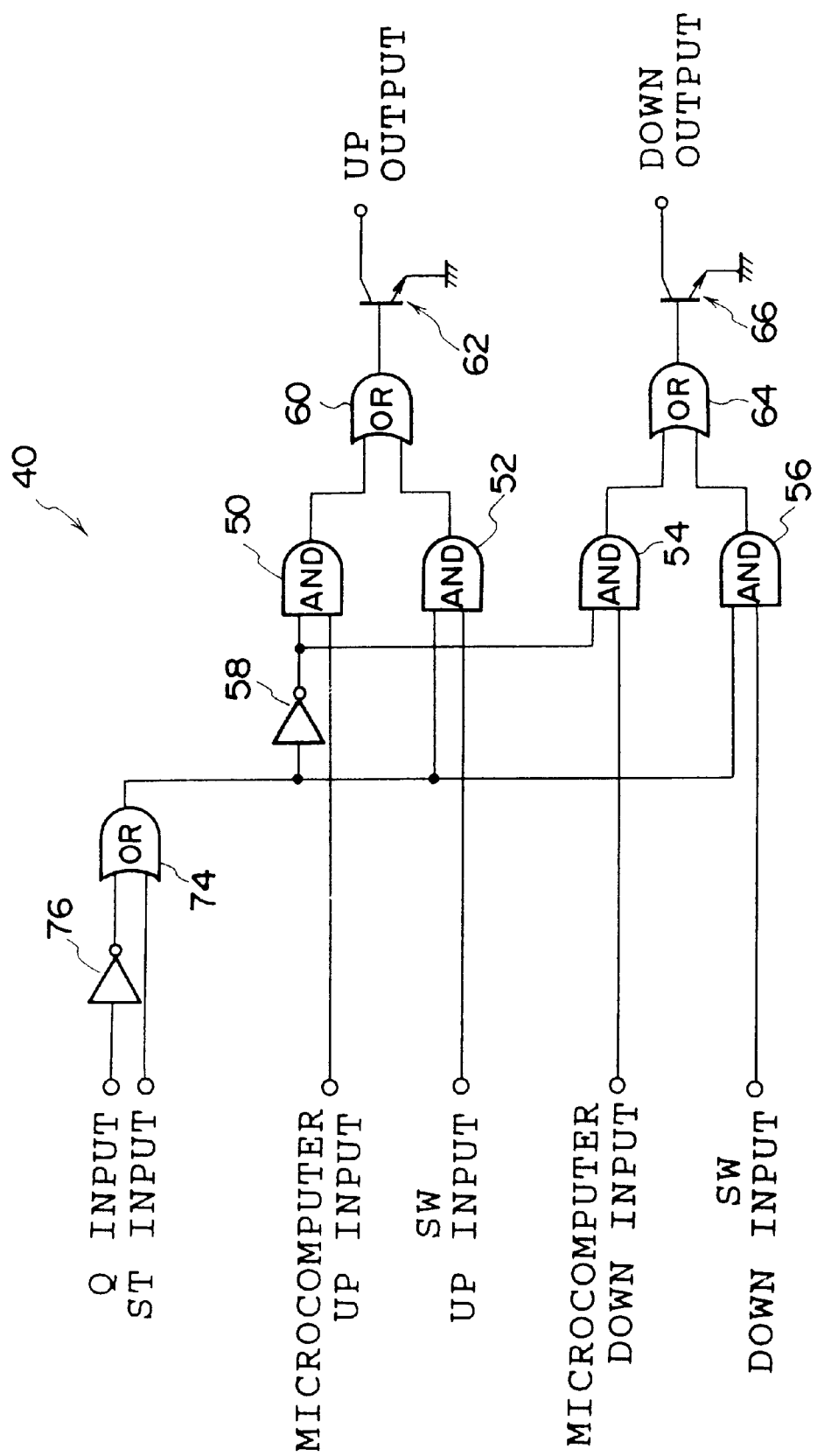

COMPUTER MONITOR DEVICE

TECHNICAL FIELD

The present invention relates to a computer monitoring device which monitors whether a computer provided at a power window system of a vehicle or the like operates normally.

TECHNICAL BACKGROUND

Conventionally, in a system using a microcomputer in which a battery is a power supply, when the microcomputer is not used, the microcomputer enters a standby mode and the execution of a program is stopped in order to reduce electricity consumption of the battery. Further, a microcomputer monitoring circuit (watchdog circuit) is provided in the system using the microcomputer. The microcomputer monitoring circuit monitors a state of the microcomputer by the output of a predetermined signal (e.g., a signal which is generated on the basis of a clock signal and will be hereinafter referred to as "clock signal") from the microcomputer. When the clock signal is not detected, the microcomputer monitoring circuit determines that the state of the microcomputer is not normal and outputs a signal which restarts the microcomputer (hereinafter, "restarting signal").

On the other hand, because the microcomputer stops the output of the above-described clock signal by entering the standby mode, the microcomputer monitoring circuit outputs the restarting signal. As a result, the microcomputer which is supposed to enter the standby mode is restarted.

In order to prevent the restarting of the microcomputer which is supposed to enter the standby mode, when the microcomputer monitoring circuit detects a signal which is output when the microcomputer enters the standby mode (hereinafter, "standby signal"), the microcomputer monitoring circuit also enters the standby mode. Namely, when the standby signal is detected, the microcomputer monitoring circuit enters the standby mode and stops the monitoring function of the microcomputer.

An example of a system which includes the microcomputer and the microcomputer monitoring circuit is a power window system of a vehicle. In this power window system, a microcomputer controls a relay or the like and operates a motor for raising and lowering a door glass in accordance with a switch operation. At this time, a microcomputer monitoring circuit monitors an operating state of the microcomputer in order to prevent the control of the motor from being disabled due to runaway or the like of the microcomputer. When it is determined that the microcomputer does not operate normally, a restarting signal is output to the microcomputer.

On the other hand, the power window system includes a microcomputer control system and an SW control system (direct control by a switch) so as to control the motor in accordance with the switch operation. The motor is usually controlled by the microcomputer control system. When the microcomputer enters the standby mode or it is determined by the operating state of the microcomputer monitoring circuit that the operation of the microcomputer fails, the motor is controlled by the SW control system. In this way, the motor can be controlled even if the microcomputer does not operate normally.

By the way, when a microcomputer port or an input terminal of the microcomputer monitoring circuit fails, the standby signal may be input to the microcomputer monitoring circuit by mistake. In this case, even when the microcomputer becomes abnormal and the restarting signal is output, since the microcomputer monitoring circuit detects the standby signal, the microcomputer monitoring circuit enters the standby mode and stops monitoring of the microcomputer which is a fundamental function.

In order to prevent this, a microcomputer monitoring circuit has been proposed which, when a restarting signal is output, does not enter a standby mode even if a standby signal is detected. This microcomputer monitoring circuit enters the standby mode when the microcomputer monitoring circuit detects the signal entering the standby mode from the time in which a predetermined signal output from the microcomputer is not detected to the time in which a signal restarting the microcomputer is output. As a result, when the microcomputer becomes abnormal and the predetermined signal is not detected, even if the signal entering the standby mode is detected, the microcomputer monitoring circuit can output the signal which urges the restarting of the microcomputer without stopping the monitoring function.

However, in this computer monitoring device (microcomputer monitoring circuit), when the microcomputer is restarted or the like in a state in which a wrong standby signal is detected and the device detects a predetermined signal which is output from the microcomputer at the time of normal operation thereof, it is determined that the microcomputer operates normally. At this time, the computer monitoring device enters the standby mode since the standby signal is detected. Thus, there is a drawback in that the monitoring of the microcomputer is stopped.

The present invention was developed in light of the above circumstances, and the object thereof is to provide a computer monitoring device which does not enter a standby mode even if a standby signal is input by mistake.

DISCLOSURE OF THE INVENTION

In order to solve the above-described problems, the present invention comprising: starting means which outputs a starting signal before starting a computer, the starting means outputting a starting signal to the computer when a first signal, which is output from the started computer in a predetermined cycle, is stopped for a predetermined period of time; start stopping means which stops an operation of the starting means when a second signal, which is output from the computer with a predetermined timing, is input; start operation determination means which outputs a third signal, which urges stopping of an operation of the start stopping means, due to inputting of the starting signal, the start operation determination means stopping outputting of the third signal by the first signal which is output from the computer only when the second signal is not detected; and operation monitoring means which stops outputting of the input second signal to the start stopping means when the start operation determination means outputs the third signal.

In accordance with the present invention, the starting means outputs the starting signal after a predetermined period of time has passed since the first signal, which is output from the computer in a predetermined cycle, is not input. When the second signal, which is output from the computer at the time of entering the standby mode, is detected, the start stopping means stops the operation of the starting means. As a result, since the computer outputs the second signal when entering the standby mode, even if the computer which enters the standby mode stops the output of the first signal, the computer is not started by the starting signal.

On the other hand, the start operation determination means outputs the third signal due to the input of the starting signal and stops the output of the third signal when the first signal is detected before the second signal is detected. Further, the operation monitoring means outputs the second signal to the start stopping means due to the detection of the second signal and, when the third signal is detected, the output of the second signal to the start stopping means is stopped.

In this way, the starting means can be operated on the basis of the first signal and outputs the starting signal if the computer stops the output of the first signal. Accordingly, when the computer is started and the second signal is input by mistake, the computer can be monitored due to the output of the third signal. When the first signal is not input, the starting signal for operating the computer normally can be output.

Further, in the present invention, when the start operation determination means detects the first signal in a state in which the second signal is not detected, the output of the third signal is stopped. Consequently, the state in which the microcomputer operates or not can be monitored by the output of the start operation determination means and the operation monitoring means.

Namely, when the computer operates normally, it can be determined that the second and the third signals are not detected. Further, when only the second signal output from the operation monitoring means is detected, it can be determined that the computer enters the standby mode. When the third signal output from the start operation determination means is detected, it can be determined that the computer is restarted.

Therefore, when the present invention is applied, for example, to monitor the computer of the power window system, only when the second signal or the third signal is not detected, it can be determined that the computer operates normally. Thus, switching between the microcomputer control system and the SW control system may be effected on the basis of this result of determination.

BRIEF DESCRIPTION OF THE DRAWINGS

FIG. 4 is a block diagram which shows an example of a relay control circuit.

EMBODIMENTS

Figure 1:
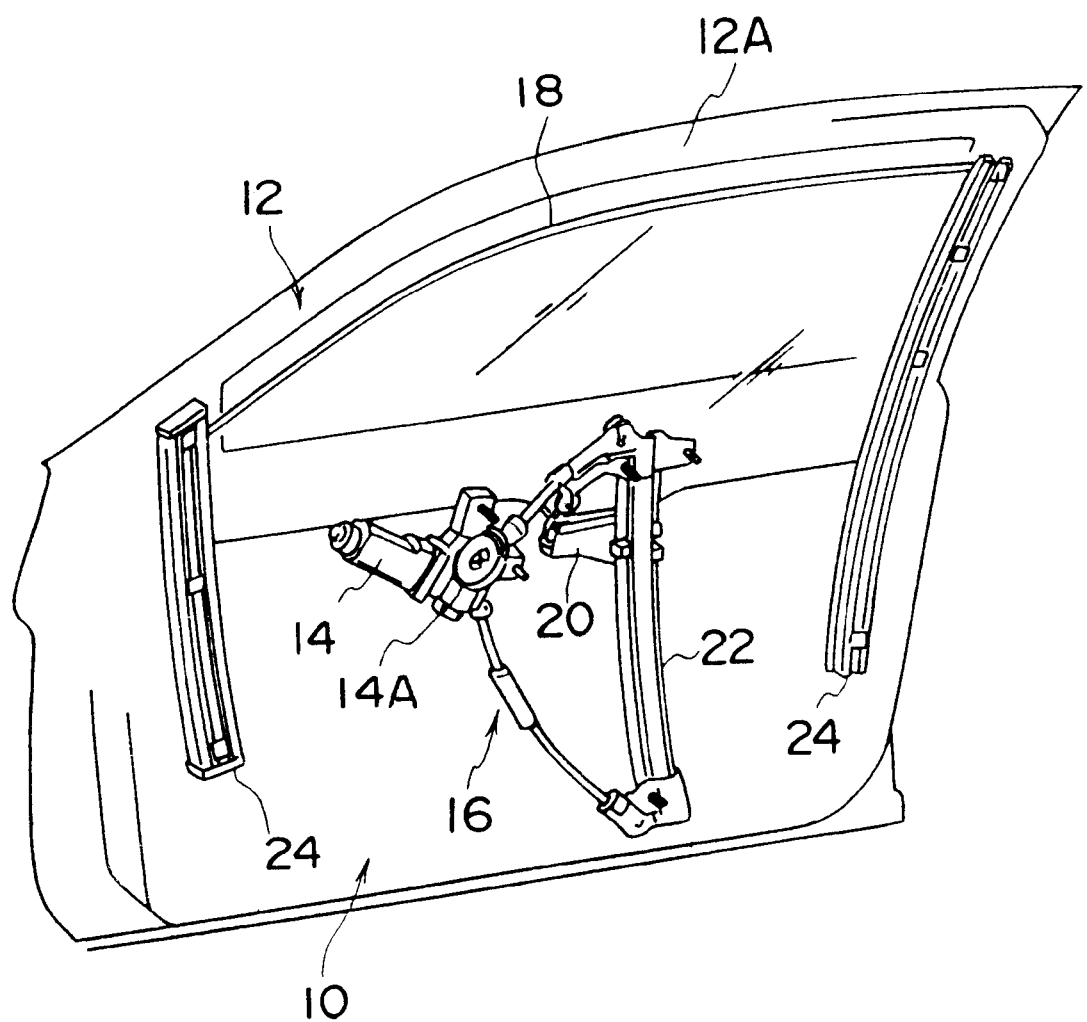
FIG. 1 is a schematic perspective view which shows the internal structure of a vehicle operator's seat side door of a present embodiment.

FIG. 1 shows the internal structure of a vehicle operator's seat side door 12. The inner portion of the vehicle operator's seat side door 12 includes a motor 14 used in a power window system 10 which is applied to a present embodiment. A window regulator portion 16 is connected to this motor 14. In the present embodiment, the window regulator portion 16 is a so-called wire type and an intermediate portion of a wire (not shown) is wound around a rotational plate 14A which is attached to a drive shaft of the motor 14. Each of the end portions of this wire is connected to a holding channel 20 which supports the lower end portion of a door glass 18, and further, the holding channel 20 is attached to a main guide 22 so as to be able to move in the vertical directions.

In this way, when the motor 14 rotates in the forward and reverse directions, the holding channel 20 moves along the main guide 22 and the door glass 18 moves in the vertical directions (rises and lowers) along glass guides 24. The window regulator portion 16 is not limited to the wire type and may be an X-arm type, a so-called motor-driven type in which a motor itself moves along a rack, or the like.

When the door glass 18 is raised by the driving of the motor 14, the peripheral end portion of the door glass 18 fits with a weather strip (not shown) which is formed of a rubber and is provided within a frame 12A of the door 12, and an opening of the door frame 12A is closed. Further, when the door glass 18 is lowered by the driving of the motor 14, the opening of the frame 12A which has been closed is opened.

Figure 2:
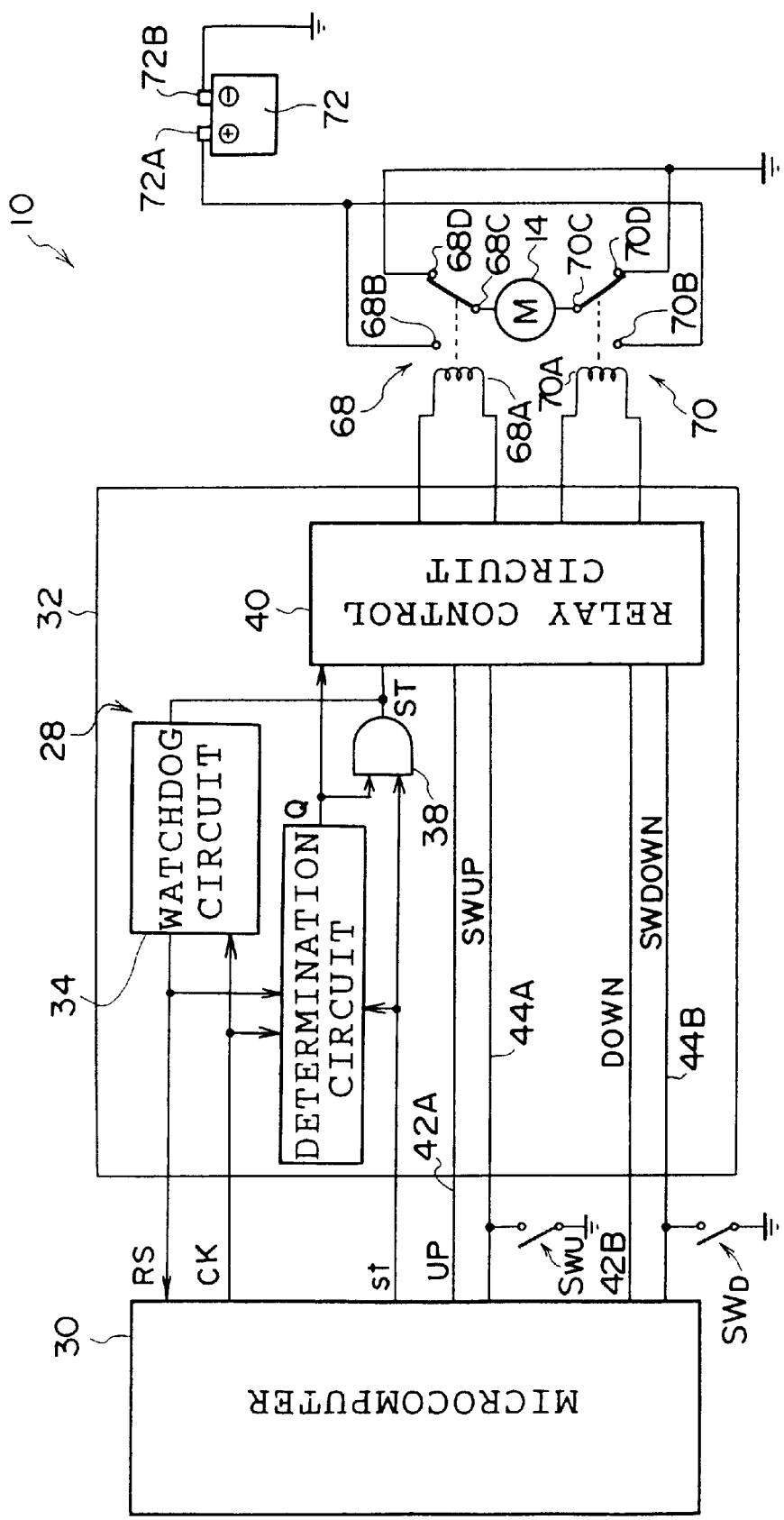
FIG. 2 is a block diagram of a power window system relating to the present embodiment.

FIG. 2 shows a control system which drives the motor 14 of the power window system 10. This control system comprises a microcomputer 30 and a control circuit 32. The microcomputer 30 is formed so that an unillustrated CPU, ROM, RAM, and various types of interfaces are connected by buses. The control circuit 32 includes a watchdog circuit 34, a determination circuit 36, an AND circuit 38, and a relay control circuit 40. A microcomputer monitoring device 28, to which the present invention is applied, is formed by the watchdog circuit 34, the determination circuit 36, and the AND circuit 38.

An UP switch $SW_U$ for raising the door glass 18 and a DOWN switch $SW_D$ for lowering the door glass 18 are connected to the microcomputer 30 and the relay control circuit 40.

When the microcomputer 30 detects that the UP switch $SW_U$ is turned on, an UP signal is output to the relay control circuit 40 via an exclusive line 42A. Further, when the microcomputer 30 detects that the DOWN switch $SW_D$ is turned on, a DOWN signal is output to the relay control circuit 40 via an exclusive line 42B. When the UP switch $SW_U$ is turned on, an SWUP signal is input to the relay control circuit 40 via a switch wiring 44A. When the DOWN switch $SW_D$ is turned on, an SWDOWN signal is input to the relay control circuit 40 via a switch wiring 44B.

In an ordinary operating state, the microcomputer 30 outputs a signal having predetermined cycles such as a signal, which has been generated by synchronizing with, for example, a clock signal or the like, to the control circuit 32 as a first signal (hereinafter, "clock signal CK"). This clock signal CK is input to the watchdog circuit 34 and the determination circuit 36 of the control circuit 32. The watchdog circuit 34 comprises start stopping means and starting means. The watch dog circuit 34 includes, for example, a timer circuit which is reset/started by the input of the clock signal CK and outputs a starting signal (reset signal RS) when a measuring time of this timer circuit reaches a predetermined time and the time is up. This reset signal RS is input from the control circuit 32 to the microcomputer 30, and the microcomputer 30 is started or restarted by the input of the reset signal RS.

Namely, when the clock signal CK is input to the watchdog circuit 34 at predetermined cycles, the watchdog circuit 34 does not output the reset signal RS. When the clock signal CK is not input, the watchdog circuit 34 outputs the reset signal RS and restarts the microcomputer 30. The reset signal RS can be switched from an H-level to an L-level.

On the other hand, the microcomputer 30 outputs a standby signal st to the control circuit 32 as a second signal. This standby signal st is input to the determination circuit 36 and the AND circuit 38, and further, a signal which is in accordance with the standby signal st (standby signal ST) is input from the AND circuit 38 to the watchdog circuit 34.

When the microcomputer 30 enters the standby mode for saving electricity or the like, the microcomputer 30 outputs the standby signal st. When the standby signal ST in accordance with the standby signal st is input from the AND circuit 38, the watchdog circuit 34 enters the standby mode.

When the watchdog circuit 34 enters the standby mode, the operation of the timer is stopped. In this way, even if the microcomputer 30 enters the standby mode and the output of the clock signal CK is stopped, the watchdog circuit 34 does not output the reset signal RS. Namely, when the standby signal ST in accordance with the standby signal st which is output from the microcomputer 30 is input, the watchdog circuit 34 enters the standby mode and stops monitoring of the microcomputer 30. When the standby signal ST in accordance with the standby signal st is stopped, the watchdog circuit 34 which has entered the standby mode resumes monitoring of the microcomputer 30.

Figure 3D:
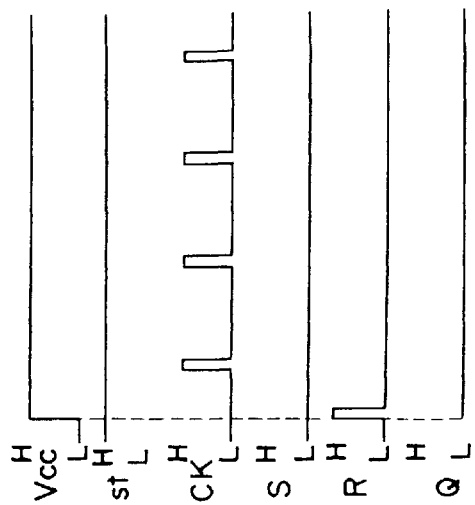
FIG. 3(A) is a logical circuit diagram which shows an example of a determination circuit and FIGS. 3(B) through 3(D) are timing charts on the basis of the logical circuit diagram shown in FIG. 3(A).
Figure 3A:
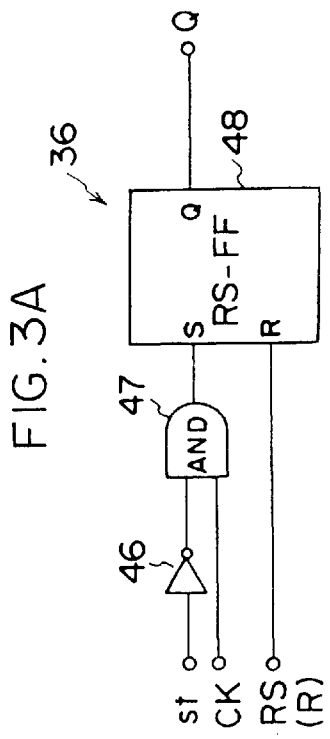

As shown in FIG. 3(A), the determination circuit 36 which is provided as start operation determination means of the present invention comprises an inverter circuit 46, an AND circuit 47, and an RS flip-flop circuit (RS-FF, hereinafter "FF circuit 48"). The standby signal st is input to the AND circuit 47 via the inverter circuit 46 and the clock signal CK is input to the AND circuit 47. In this way, the AND circuit 47 outputs a set signal S to the FF circuit 48 in accordance with the clock signal CK and the standby signal st which is input via the inverter circuit 46.

Further, the reset signal RS output from the watchdog circuit 34 is input to the FF circuit 48 as a reset signal R. The FF circuit 48 resets an output signal Q due to the input of the reset signal R. In the present embodiment, the reset output signal Q is a third signal.

Figure 3C:
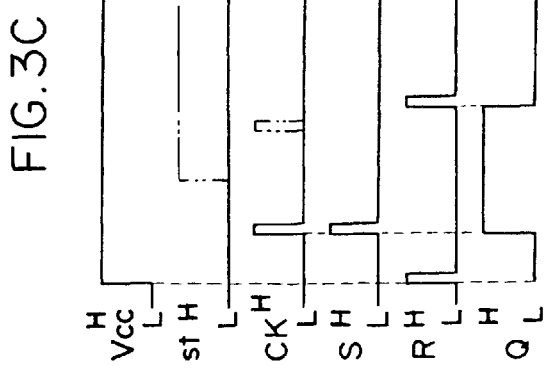
Figure 3B:
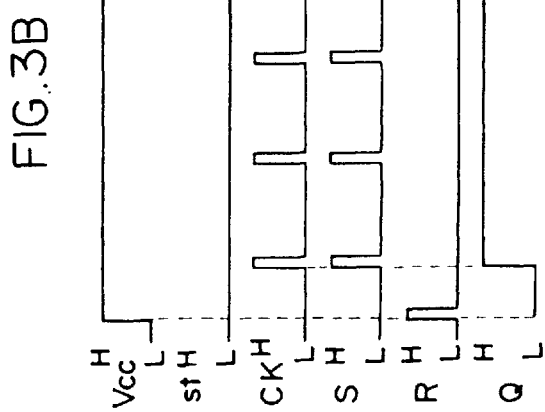

Namely, as shown in FIG. 3(B), in the determination circuit 36, the determination signal Q is held at an H-level by the input of the set signal S. Further, when the reset signal R is input, the determination signal Q is reset and held until the next set signal S is input, and is output as a third signal. Moreover, as shown in FIG. 3(C), in the determination circuit 36, when the reset signal R is input again, the output signal Q of the FF circuit 48 is reset.

On the other hand, as shown by a double-dashed chain line in FIG. 3(C), in the determination circuit 36, even if the clock signal CK is input, the set signal S is not output by the input of the standby signal st. At this time, the output signal Q is reset by the input of the reset signal R. When, for example, an unillustrated ignition switch of the vehicle is turned on and a power supply voltage Vcc is applied, the watchdog circuit 34 outputs the reset signal RS and starts the microcomputer 30.

Consequently, as shown in FIG. 3(D), when supply of the power supply voltage Vcc is started, the determination circuit 36 is reset by the reset signal R output from the watchdog circuit 34. However, when the standby signal st is detected at this time, the determination circuit 36 does not output the set signal S even if the clock signal CK is input. In this way, the output signal Q of the determination circuit 36 is held in a reset state.

On the other hand, as shown in FIG. 2, the output signal Q of the determination circuit 36 and the standby signal st output from the microcomputer 30 are input to the AND circuit 38 which is provided as operation monitoring means of the present invention. When the microcomputer 30 outputs the standby signal st, this AND circuit 38 outputs the standby signal st as the standby signal ST to the watchdog circuit 34 and the relay control circuit 40 in accordance with the output signal Q of the determination circuit 36.

FIG. 3 shows an example of the relay control circuit 40. This relay control circuit 40 is provided with four AND circuits 50, 52, 54, and 56. The UP signal output from the microcomputer 40 is input to one input terminal of the AND circuit 50, the SWUP signal of the UP switch $SW_U$ is input to one input terminal of the AND circuit 52, the DOWN signal output from the microcomputer 40 is input to one input terminal of the AND circuit 54, and the SWDOWN signal of the DOWN switch $SW_D$ is input to one input terminal of the AND circuit 56.

Further, as shown in FIG. 2, the standby signal ST which is output from the AND circuit 38 and the output signal Q which is output from the determination circuit 36 are input to the relay control circuit 40.

As shown in FIG. 4, the standby signal ST and the output signal Q are input to an OR circuit 74. The output signal Q is input to the OR circuit 74 via an inverter circuit 76 as an inverted signal Q*.

A signal which is output from the OR circuit 74 is input to the other input terminals of the AND circuits 52 and 56, and further, the output signal of the OR circuit 74 is inverted by an inverter circuit 56 and input to the AND circuits 50 and 54.

Output terminals of the AND circuits 50 and 52 are connected to input terminals of an OR circuit 60, and an output terminal of this OR circuit 60 is connected to the base of a transistor 62. Moreover, output terminals of the AND circuits 54 and 56 are connected to input terminals of an OR circuit 64, and an output terminal of this OR circuit 64 is connected to the base of a transistor 66.

Figure 5:
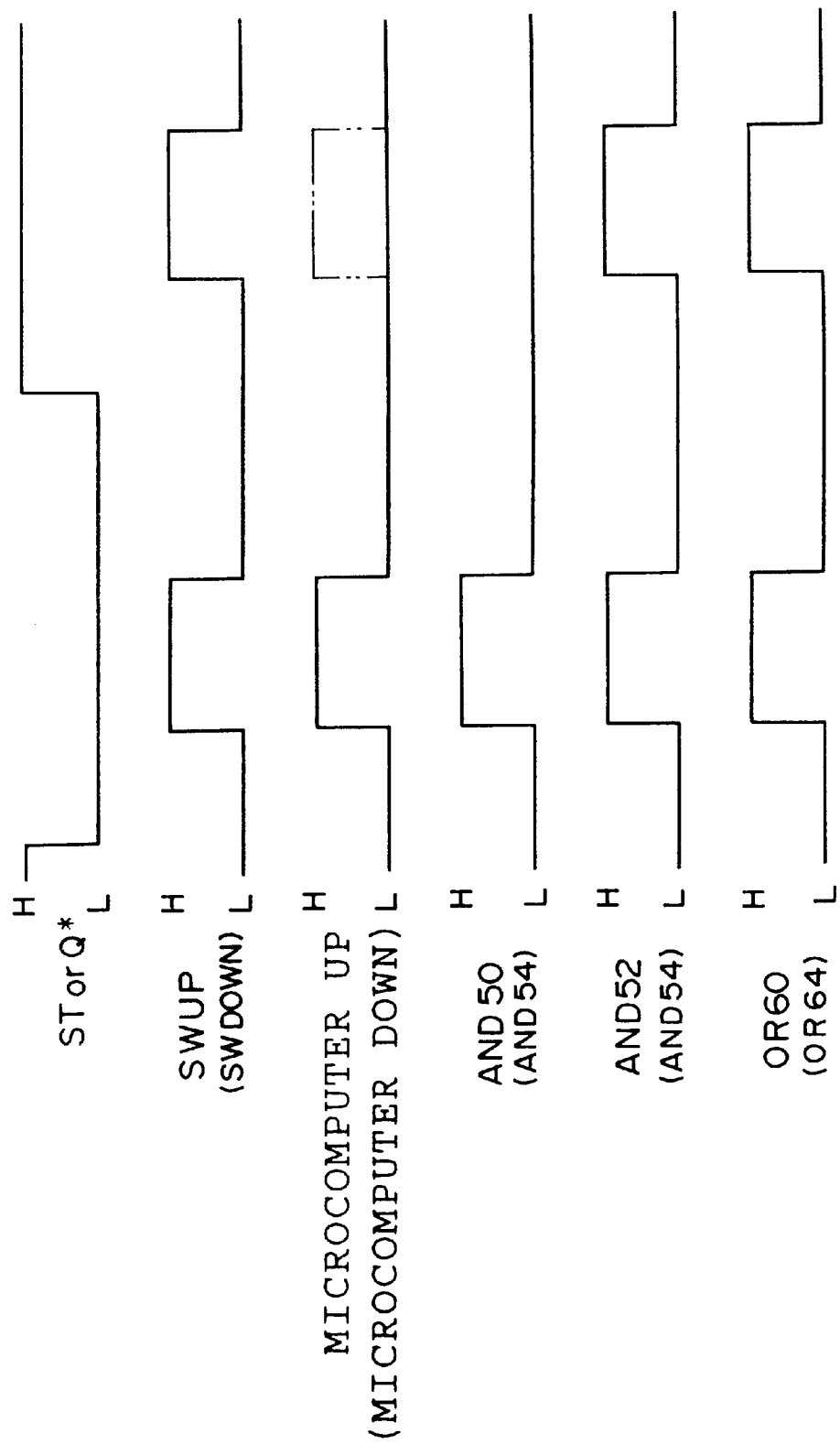
FIG. 5 is a timing chart which shows an operation of the relay control circuit.

In this way, as shown in FIG. 5, when the standby signal ST or the signal Q* inverted from the output signal Q is held at an L-level, the signals, which are output from the OR circuits 60 and 64 by the output of the AND circuits 50 and 54, drive the transistors 62 and 66. Further, when the standby signal ST or the signal Q* inverted from the output signal Q is held at an H-level, the signals, which are output from the OR circuits 60 and 64 by the output of the AND circuits 52 and 56, drive the transistors 62 and 66. By driving the transistors 62 and 66, the transistor 62 outputs a motor UP signal and the transistor 66 outputs a motor DOWN signal.

As shown in FIG. 2, the motor UP signal output from the transistor 62 is input to a relay coil 68A of a relay 68 and the motor DOWN signal output from the transistor 66 is input to a relay coil 70A of a relay 70.

The motor 14 is connected between a common terminal 68C of the relay 68 and a common terminal 70C of the relay 70. Further, contacts 68B and 70B are respectively connected to the common terminals 68C and 70C in a state in which the relays 68 and 70 operate and are connected to a plus side terminal 72A of a battery 72 which supplies electricity for driving the motor 14. Another contacts 68D and 70D are grounded in the same way as a minus side terminal 72B of the battery 72.

In this way, as the relay coil 68A of the relay 68 is energized by the motor UP signal output from the relay control circuit 40, the common terminal 68C is connected to the contact 68B and the motor 14 is driven in the direction of raising the window glass 18. Further, as the relay coil 70A of the relay 70 is energized by the motor DOWN signal output from the relay control circuit 40, the common terminal 70C is connected to the contact 70B and the motor 14 is driven in the direction of lowering the window glass 18.

Next, the operation of the present embodiment will be explained.

When the unillustrated ignition switch of the vehicle is turned on and the power supply electricity Vcc is supplied as driving electricity, the power window system 10 can be driven. Moreover, the watchdog circuit 34 outputs the reset signal RS by the supplying of the power supply voltage Vcc. The microcomputer 30 is started by this reset signal RS. When the starting of the microcomputer 30 begins, the microcomputer 30 outputs the clock signal CK at predetermined cycles. In this way, the watchdog circuit 34 starts monitoring of the microcomputer 30.

On the other hand, in the determination circuit 36, when the clock signal CK is input, the set signal S is output and the reset output signal Q is set and held at an H-level. The output signal Q is output to the AND circuit 38 as a signal for determining the operating state of the microcomputer 30 by the determination circuit 36. Namely, when the microcomputer 30 operates normally, a predetermined determination signal is output from the determination circuit 36.

The output signal Q from the determination circuit 36 and the standby signal st from the microcomputer 30 are input to the AND circuit 38. When the microcomputer 30 does not output the standby signal st, the AND circuit 38 outputs an L-level signal.

As shown in FIG. 5, when the standby signal ST is output, in the relay control circuit 40, the AND circuits 50 and 54 switch the outputs in accordance with the UP signal and the DOWN signal which are output from the microcomputer 30 based on the operations of the UP switch $SW_U$ and the DOWN switch $SW_D$. In this way, the transistors 62 and 66 are driven and the window glass 18 is raised and lowered.

Figure 6A:
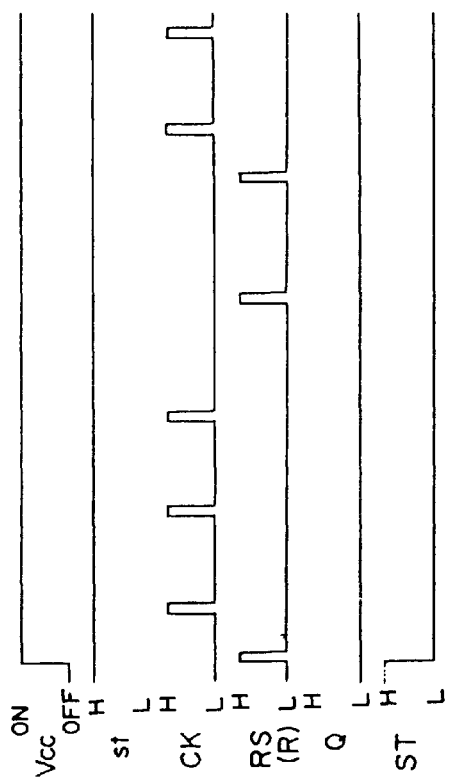
FIGS. 6(A) through 6(D) are timing charts which show operations of a control circuit.

As shown in FIG. 6(A), when the standby signal st is output from the microcomputer 30, the AND circuit 38 outputs the standby signal ST in accordance with the standby signal st and the output signal Q of the determination circuit 36. This standby signal ST is input to the watchdog circuit 34 and the relay control circuit 40.

Since the standby signal ST which is in accordance with the standby signal st output from the microcomputer 30 is input to the watchdog circuit 34, the watchdog circuit 34 enters the standby mode. As a result, electricity to be consumed is cut down.

Further, as shown in FIG. 5, when the standby signal ST is input to the relay control circuit 40, the outputs of the AND circuits 50 and 54, in which the UP signal and the DOWN signal are input from the microcomputer 30, are held at L-levels, and the transistors 62 and 66 are driven on the basis of outputs of the AND circuits 52 and 56.

As shown in FIG. 6(A), when the watchdog circuit 34 enters the standby mode, since the monitoring of the microcomputer 30 is suspended, the watchdog circuit 34 does not output the reset signal RS which restarts the microcomputer 30 to the microcomputer 30 even if the clock signal CK is not input from the microcomputer 30. Moreover, when the output of the standby signal st is stopped, the standby mode of the watchdog circuit 34 is terminated, and thereafter, the watchdog circuit 34 resumes monitoring which is based on the clock signal CK output from the microcomputer 30.

Figure 6C:
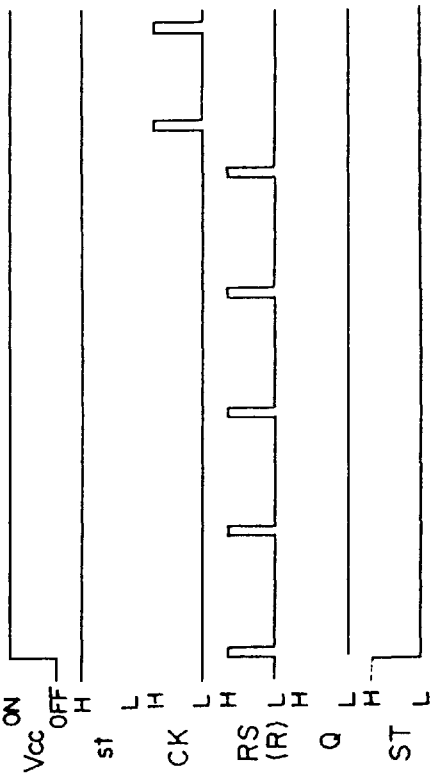
Figure 6B:
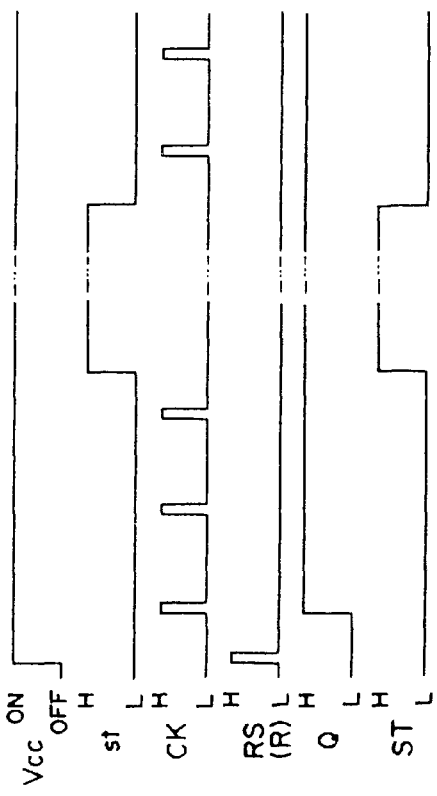

On the other hand, as shown in FIG. 6(B), when the clock signal CK is not input from the microcomputer 30, the watchdog circuit 34 outputs the reset signal RS to the microcomputer 30 and urges restarting of the microcomputer 30. The reset signal RS which is output from this watchdog circuit 34 is input to the determination circuit 36 as the reset signal R. When the reset signal R is input, the determination circuit 36 holds by switching the output signal Q to an L-level.

In this way, whether the standby signal st is input or not, the AND circuit 38 does not output the standby signal ST. Namely, as shown by a double-dashed chain line in FIG. 6(B), even if the standby signal st is input, since the clock signal CK is not input, the output signal Q is held in a reset state (at an L-level).

The reset output signal Q is also output to the relay control circuit 40. As shown in FIG. 5, when the reset output signal Q is input to the relay control circuit 40, the transistors 62 and 66 are driven by the outputs of the AND circuits 52 and 56 in the same way as the standby signal ST is input.

In this way, in the microcomputer monitoring device 28, even if the standby signal st is input by mistake, the watchdog circuit 34 outputs the reset signal RS for restarting the microcomputer 30 without entering the standby mode and can urge restarting of the microcomputer 30. Moreover, since the relay control circuit 40 is switched so as to directly control the motor 14 on the basis of the output signal Q of the determination circuit 36 which is input from the microcomputer monitoring device 28 and in accordance with the operation of the UP switch $SW_U$ and the DOWN switch $SW_D$, an erroneous operation does not occur.

Further, when the standby signal st which is input by mistake is stopped, the microcomputer monitoring device 28 can start monitoring the microcomputer 30 normally.

Figure 6D:
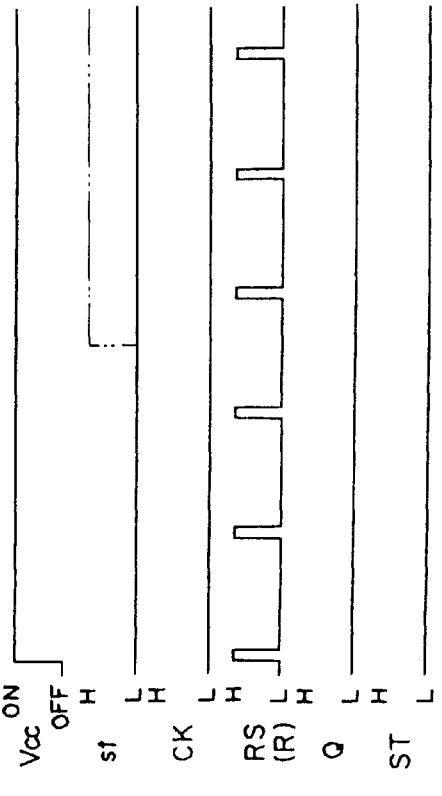

In a state in which the standby signal st is input to the microcomputer monitoring device 28, the microcomputer 30 may be restarted due to the input of the power supply voltage Vcc or the like. FIGS. 6(C) and 6(D) show examples in which the microcomputer monitoring device 28 detects the standby signal st when the power supply Vcc is input.

As the power supply voltage Vcc is applied, the watchdog circuit 34 outputs the reset signal RS and urges starting of the microcomputer 30. In this way, the output signal Q of the determination circuit 36 is reset. Thereafter, as shown in FIG. 6(C), even if the clock signal CK is input from the microcomputer 30 to the determination circuit 36, since the set signal S is output to the FF circuit 48 due to the input of the standby signal st, the output signal Q is held in a reset state.

Further, as shown in FIG. 6(D), the watchdog circuit 34 outputs the reset signal RS and continuously outputs the reset signal RS unless the clock signal CK is input from the microcomputer 30.

On the other hand, as shown in FIGS. 6(C) and 6(D), because the reset output signal Q is input to the AND circuit 38, even if the standby signal st is input thereto the standby signal ST is not output. As a result, the watchdog circuit 34 does not enter the standby mode and continuously monitors the microcomputer 30.

In this way, for example, when the clock signal CK is stopped, the reset signal RS is output. There after, when the clock signal CK is output from the started microcomputer 30, the microcomputer 30 stops the output of the reset signal RS and is continuously monitored.

Thus, in the microcomputer monitoring device 28 applied to the present embodiment, even if the standby signal st is input when the microcomputer 30 is started, the microcomputer monitoring device 28 does not enter the standby mode and can continuously monitor the microcomputer 30. Further, because the microcomputer monitoring device 28 receives the standby signal st and enters the standby mode only when the microcomputer 30 operates normally, it can be prevented that, when the microcomputer 30 does not operate normally, the watchdog circuit 34 enters the standby mode by the standby signal st which is input by mistake and that the microcomputer 30 cannot be monitored(restarted).

The above-described present embodiment shows an example to which the present invention is applied and the structure and the application of the present invention are not limited to the same. In the present embodiment, an example is described of a case in which the power window system 10 of the vehicle is provided at the vehicle operator's seat side door 12. However, the present invention is not limited to this and may be applied, in various types of control systems using a computer, to a computer monitoring device in which a computer is monitored and stopped being monitored on the basis of a first signal which is output from the computer in a predetermined cycle in accordance with a clock signal or the like and a second signal which is output from the computer with a predetermined timing.

As described above, in the present invention, even if the second signal is input by mistake, start stopping means operates so as to not disable the monitoring of the computer. As a result, a superior effect is achieved in that the computer can be reliably monitored even if the computer is started in a state in which the second signal is input.

What is claimed is:

1. A computer monitoring device, comprising:

starting circuit which outputs a starting signal before starting a computer, said starting circuit outputting a starting signal to the computer when a clock signal, which is output from the started computer in a predetermined cycle, is stopped for a predetermined period of time;

start stopping circuit which stops an operation of said starting circuit when a standby signal, which is output from the computer with a predetermined timing, is input;

start operation determination circuit which outputs a third signal in response to inputting of the starting signal, which urges stopping of an operation of said start stopping circuit, said start operation determination circuit stopping outputting of the third signal by detecting the clock signal which is output from the computer only when the standby signal is not detected; and operation monitoring circuit which stops outputting of the input standby signal to said start stopping circuit when said start operation determination circuit outputs the third signal.

2. The computer monitoring device according to claim 1, wherein said starting circuit and said start stopping circuit are both included within a single watchdog circuit.

3. The computer monitoring device according to claim 1, wherein said start operation determination circuit outputs a reset third signal in response to said inputting of the starting signal which becomes a set signal when said start operation determination circuit does not detect said standby signal when said clock signal is input.

4. The computer monitoring device according to claim 3, wherein said third signal remains in a reset state which prevents an operation of the start stopping circuit if said start operation determination circuit detects said standby signal when said clock signal is input.

5. A power saving control circuit comprising:

a watchdog circuit that monitors the status of a computer, and forwards a reset signal to the computer if a clock signal is not received;

a determination circuit that controls an awake status of the watchdog circuit based on the clock signal and a standby signal, wherein if the clock signal and the standby signal are being received from the computer, the determination circuit outputs a watchdog circuit standby signal that allows the watchdog circuit to enter a sleep mode.

6. The circuit of claim 5, wherein if the clock signal is not begin received and the standby signal is being received from the computer, the determination circuit outputs a signal that does not allows the watchdog circuit to enter a sleep mode.

* * * * *